United States Patent
Hellinger et al.

(10) Patent No.: US 12,512,720 B2
(45) Date of Patent: Dec. 30, 2025

(54) CONTACT PIN, SUPPORT BOARD AND ELECTRICAL MACHINE

(71) Applicant: MELECS EWS GmbH, Siegendorf (AT)

(72) Inventors: Leopold Hellinger, Ziersdorf (AT); Philipp Neumann, St. margarethen an der Sierning (AT); Thomas Kulawik, Vienna (AT); Herbert Nemeth, Vienna (AT); Michael Käfer, Vienna (AT)

(73) Assignee: MELECS EWS GMBH, Siegendorf (AT)

( * ) Notice: Subject to any disclaimer, the term of this patent is extended or adjusted under 35 U.S.C. 154(b) by 386 days.

(21) Appl. No.: 17/614,816

(22) PCT Filed: May 25, 2020

(86) PCT No.: PCT/EP2020/064389
§ 371 (c)(1),
(2) Date: Nov. 29, 2021

(87) PCT Pub. No.: WO2020/239666
PCT Pub. Date: Dec. 3, 2020

(65) Prior Publication Data
US 2022/0231569 A1    Jul. 21, 2022

(30) Foreign Application Priority Data

May 29, 2019   (AT) .............................. A 50496/2019

(51) Int. Cl.
*H02K 5/22* (2006.01)
*H01R 13/24* (2006.01)

(52) U.S. Cl.
CPC ......... *H02K 5/225* (2013.01); *H01R 13/2428* (2013.01)

(58) Field of Classification Search
CPC ............................ H02K 5/225; H01R 13/2428
See application file for complete search history.

(56) References Cited

U.S. PATENT DOCUMENTS 7,438,559 B2   10/2008   Ryu et al.
9,356,379 B2   5/2016    Jocham et al.
(Continued)

FOREIGN PATENT DOCUMENTS

CN   103988377 A   8/2014
CN   106796934 A   5/2017
(Continued)

OTHER PUBLICATIONS

PCT International Search Report dated Sep. 18, 2020 based on PCT/EP2020/064389 filed May 25, 2020.
(Continued)

*Primary Examiner* — Forrest M Phillips
(74) *Attorney, Agent, or Firm* — Cozen O'Connor

(57) ABSTRACT

In order to create favorable structural conditions, at least one first component longitudinal portion and a second component longitudinal portion are provided, where the first component longitudinal portion has a greater level of rigidity than the second component longitudinal portion, such that thereby reducing contact zone wear is reduced, while favorable mounting characteristics are also created at the same time.

11 Claims, 3 Drawing Sheets

(56) References Cited

U.S. PATENT DOCUMENTS

| | | | |
|---|---|---|---|
| 9,843,121 B1 * | 12/2017 | Sparrowhawk | ........ H01R 24/64 |
| 9,941,254 B2 | 4/2018 | Kodaira | |
| 2007/0082559 A1 | 4/2007 | Ryu et al. | |
| 2009/0108688 A1 | 4/2009 | Miura | |
| 2014/0170878 A1 | 6/2014 | Jocham et al. | |
| 2014/0299368 A1 | 10/2014 | Braunger et al. | |
| 2017/0200704 A1 * | 7/2017 | Kodaira | .............. H01L 23/3735 |
| 2017/0214184 A1 * | 7/2017 | Takai | ...................... H01R 13/40 |
| 2017/0331342 A1 | 11/2017 | Beetz et al. | |
| 2023/0094577 A1 * | 3/2023 | Kranz | .................. G01R 15/207 |
| | | | 324/114 |

FOREIGN PATENT DOCUMENTS

| | | | | |
|---|---|---|---|---|
| CN | 107210641 A | 9/2017 | | |
| DE | 102012223431 | 6/2014 | | |
| DE | 102012223431 A1 * | 6/2014 | ............. | H01R 13/41 |
| DE | 102017209626 | 12/2018 | | |
| DE | 102017216807 | 3/2019 | | |
| DE | 102017218182 | 3/2019 | | |
| DE | 102018009921 A1 * | 6/2020 | ............. | H01R 13/04 |
| EP | 1919035 | 5/2008 | | |
| EP | 2665128 A1 * | 11/2013 | .......... | H01R 12/515 |
| JP | H11162592 | 6/1999 | | |
| JP | 2007-311123 | 11/2007 | | |
| JP | 2012-174477 | 9/2012 | | |
| JP | 2015079584 | 4/2015 | | |
| JP | 2016213176 | 12/2016 | | |
| WO | 2006004335 | 1/2006 | | |
| WO | WO 2016/163237 | 10/2016 | | |
| WO | 2018114349 | 6/2018 | | |

OTHER PUBLICATIONS

Examination Report dated Jan. 13, 2021 based on A50496/2019 filed May 29, 2019.

* cited by examiner

CONTACT PIN, SUPPORT BOARD AND ELECTRICAL MACHINE

CROSS-REFERENCE TO RELATED APPLICATIONS

This is a U.S. national stage of application No. PCT/EP2020/064389 filed 25 May 2020. Priority is claimed on Austria Application No. A50496/2019 filed 29 May 2019, the content of which is incorporated herein by reference in its entirety.

BACKGROUND OF THE INVENTION

1. Field of the Invention

The invention relates to a contact pin for an electric machine.

2. Description of the Related Art

Particularly in vehicle electronics, there is frequently the need to integrate devices with control electronics into a motor, into a transmission, etc., in order to make as good use as possible of limited installation space and to keep cable runs short. Interface components such as contact pins, are in this case exposed to significant loads.

WO 2018/114349 A1, for example, discloses an electric machine having a cooling device. Here, a plug connector is connected to a support plate. However, it is not apparent to what extent this plug connector is designed appropriately in terms of load-bearing capacity with respect to possible relative movements between the plug connector and devices that may be connected thereto.

SUMMARY OF THE INVENTION

It is an object of the to provide a contact pin that is highly suitable for locally different mechanical and/or thermal loads.

This and other objects and advantages are achieved in accordance with the invention by a contact pin of the type mentioned at the beginning, where at least one first component longitudinal portion and one second component longitudinal portion are provided, where the first component longitudinal portion has a greater level of rigidity than the second component longitudinal portion.

As a result, little contact-zone wear is brought about between the contact pin and components or devices connected thereto, with, at the same time, favorable mounting properties. The first component longitudinal portion of the contact pin is formed in a rigid manner so that it can be pressed, for example, into a support plate.

The second component longitudinal portion of the contact pin is less rigid than the first component longitudinal portion and, depending on the loads acting on it (for example, mechanical loads on account of relative movements between components connected to the contact pin or thermal loads on account of heat transmission from the connected components to the contact pin), can elastically deform.

Depending on the type of loads, the greater rigidity of the first component longitudinal portion, or the lower rigidity of the second component longitudinal portion, can be, for example, flexural rigidity and/or torsional rigidity. A low level of rigidity of the second component portion can be achieved, for example, because it is in manner so as to bend in multiple opposite directions, has a plurality of recesses and/or is formed in a manner so as to include multiple slots.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is explained in more detail in the following text on the basis of exemplary embodiments, in which.

DETAILED DESCRIPTION OF THE EXEMPLARY EMBODIMENT

Figure 1:
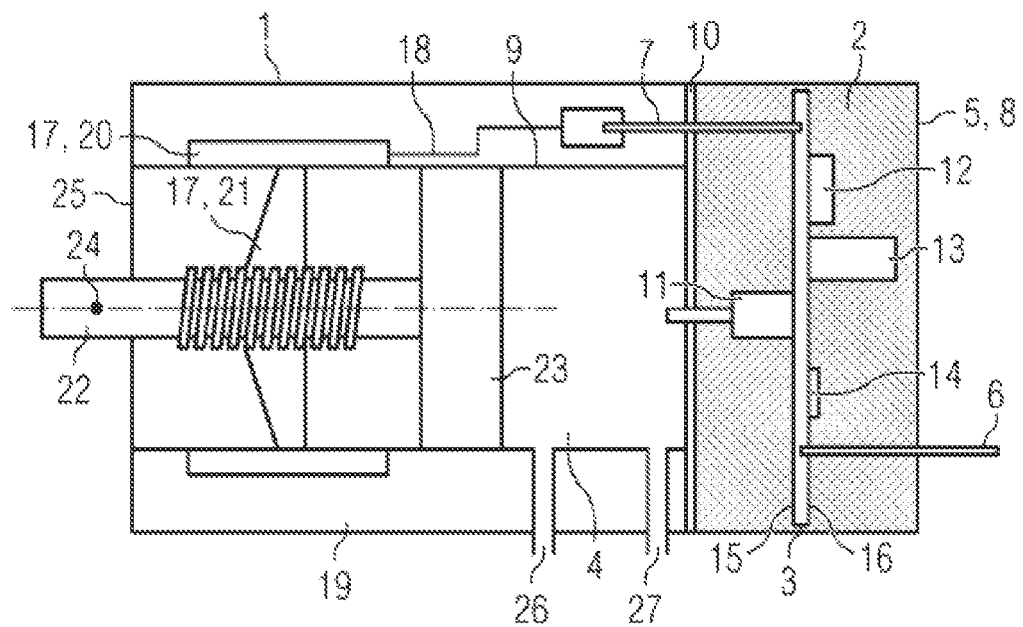
FIG. 1 shows a schematic side elevation of a machine having a support plate and contact pins in a sectional illustration in accordance with the invention.

FIG. 1 shows an exemplary embodiment of an electric machine in accordance with the invention in a sectional illustration.

An open-loop or closed-loop control unit formed as an electronic regulator 5 has a support plate 3 which, entirely encapsulated in a thermally conductive potting compound 2 made of polyurethane, is arranged in a first housing 8, which is made from polyamide reinforced with glass fibers.

Provided on the support plate 3 are a first equipment element 11, which is formed as a pressure sensor, and a second equipment element 12, a third equipment element 13 and a fourth equipment element 15, which are encased by the potting compound 2. The first equipment element 11 is arranged on an underside 15 of the support plate 3, and the second equipment element 12, the third equipment element 13 and the fourth equipment element 14 are arranged on a top side 16 of the support plate 3. The support plate 3 is thus equipped on both sides.

The first housing 8 and the support plate 3 are formed in a cylindrical manner. The first housing 8 is terminated at its end via an inserted plate 10. The plate 10 is clamped in place by the first housing 8.

The potting compound 2 completely fills a housing interior formed by the first housing 8 and the plate 10. The polyurethane of the potting compound 2 has a Shore A hardness in the range between 48 and 53, a thermal conductivity of 0.97 W/mK and a glass transition temperature of about −60° C. The electric machine can therefore be used in a wide temperature range.

The potting compound 2 being made of polyurethane represents a favorable solution. In accordance with the invention, it is also conceivable, however, to make the potting compound 2 from silicone with a Shore A hardness in the range between 45 and 55, this resulting in comparable properties being achieved in comparison to when the potting compound 2 is made of polyurethane.

In the region of the top side 16 of the support plate 3, a first contact pin 6 in the form of a first silver contact pin is connected to the support plate 3 and projects out of the first housing 8. The support plate 3 is connected to a power supply (not illustrated) via this first contact pin 6, and further contact pins that are not visible in FIG. 1, likewise formed as silver contact pins, are connected to the support plate 3 in the region of the top side 16, and project out of the first housing 8.

In the region of the underside 15 of the support plate 3, a second contact pin 7 embodied as a second silver contact pin, and further contact pins that are not visible in FIG. 1 and are in the form of further silver contact pins are connected to the support plate 3.

Via the second contact pin 7 and the further contact pins arranged in the region of the underside 15 of the support plate 3, the regulator 5 is connected to a motor 17 of a fluidic actuator 1 in the form of a hydraulic actuator.

The regulator 5 is connected to the actuator via a clamped connection. In accordance with the invention, it is also conceivable, however, to provide screw connections between the regulator 5 and the actuator 1.

The first contact pin 6, the second contact pin 7 and the further contact pins are partially encased by the potting compound 2.

Provided between the second contact pin 7 and the motor 17 is a first cable run 18, and further cable runs that are not visible are provided between the further contacts arranged in the region of the underside 15 of the support plate 3. The first cable run 18 and the further cable runs are arranged within the actuator 1, in a ring part 19 of the actuator 1. Cables extending between the regulator 5 and the actuator 1 are not necessary. The actuator 1, or the ring part 19 thereof, is attached to the open-loop or closed-loop control unit in a flush manner or terminates flush with the first housing 8.

The motor 17 is formed as a brushless DC electric motor with an annular stator 20 and a rotor 21. The stator 20 is provided in the ring part 19 of the actuator 1. Via the stator 20, or the connection thereof to the regulator 5, the rotor 21, which is mounted in the actuator 1 so as to be rotatable but not movable in translation, is driven. Rotary movements of the rotor 21 are transmitted to a spindle-like portion of the piston rod 22, with the result that the piston rod 22 and a piston 23 connected thereto execute movements in translation in the direction of a longitudinal axis 24.

The piston rod 22 and the piston 23 are provided in a cylinder 25 of the actuator 1, which is encased by the ring part 19. The piston rod 22 is mounted and guided in the cylinder 25 via a bearing (not shown), such that it can perform rotational and translational movements. Provided between the piston rod 22 and the cylinder 25 is a first seal, which is likewise not illustrated, for preventing moisture and particles etc. from penetrating into the cylinder 25.

A chamber 4, which is formed by the movable piston 23 and the cylinder 25, is filled with a hydraulic fluid. The cylinder 25 therefore acts as a second housing 9 with regard to this hydraulic fluid. The chamber 4, or the second housing 9, directly borders the plate 10 of the regulator 5. The open-loop or closed-loop control unit comes into contact with the chamber 4 in the region of the potting compound 2. As a result, heat that is transmitted into the potting compound 2 by the support plate 3, or the first equipment element 11, the second equipment element 12, the third equipment element 13 and/or the fourth equipment element 14, is dissipated by the potting compound 2, via the plate 10, into the chamber 4, i.e., to the hydraulic fluid.

In accordance with the invention, it is also possible to dispense with the plate 10, with the result that the potting compound 2 directly adjoins the chamber 4. The chamber 4 is connected via a first hydraulic line 26 to a hydraulic container (not shown), i.e., supplied with hydraulic fluid via this hydraulic container.

Via a second hydraulic line 27, the chamber 4 is connected to a hydraulic telescopic shock absorber (likewise not illustrated) of a motor vehicle. With the piston 23, or a pressure of the hydraulic fluid, a damping action of the telescopic shock absorber is set. To this end, the pressure in the chamber 4 is measured continuously via the pressure sensor or the first equipment element 11, the measurement probe of which projects into the chamber 4.

Provided between the first equipment element 11 and the cylinder 25 is a second seal (not illustrated) for preventing the potting compound 2 from being wetted with hydraulic fluid. With the regulator 5, the measured pressure is compared continuously with a defined setpoint pressure. Based on a difference between the measured pressure and the setpoint pressure, the motor 17 is regulated by the regulator 5 via corresponding voltage stipulations at the stator 20, i.e., the motor 17 is switched on or off or a speed of the rotor 21 is set, in order to reach or maintain the setpoint pressure in the hydraulic fluid or in the telescopic shock absorber via corresponding piston settings and movements.

The actuator 1 being formed as a hydraulic actuator represents a favorable solution. In accordance with the invention, it is also conceivable, however, for the actuator 1 to be formed, for example, as a pneumatic actuator and for this pneumatic actuator to be used for setting brake cylinder pressures in a truck brake of a rail vehicle.

Furthermore, it is conceivable for the open-loop or closed-loop control unit not be used as a regulator 5 but as a control unit, i.e., without a variable to be controlled being measured via a sensor or without this variable having a retroactive effect on a manipulated variable. For example, the control unit can be used in a hydraulic clamping device. In this connection, it is also conceivable for the open-loop or closed-loop control unit to be formed as an electronic control unit (ECU).

Figure 2:
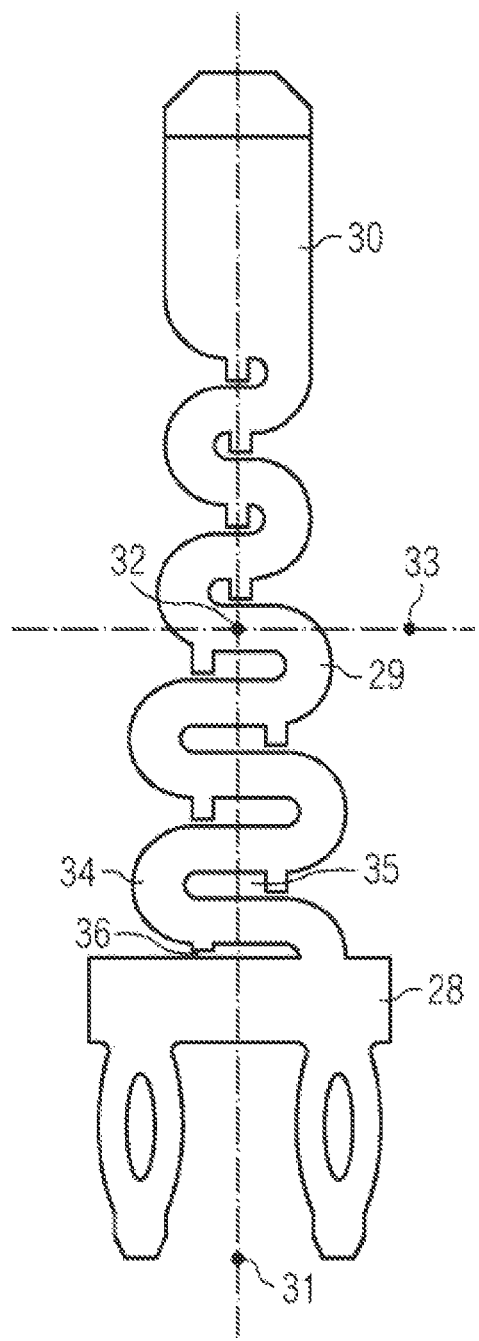
FIG. 2 shows a side elevation of a first exemplary embodiment a contact pin in accordance with the invention.
Figure 3:
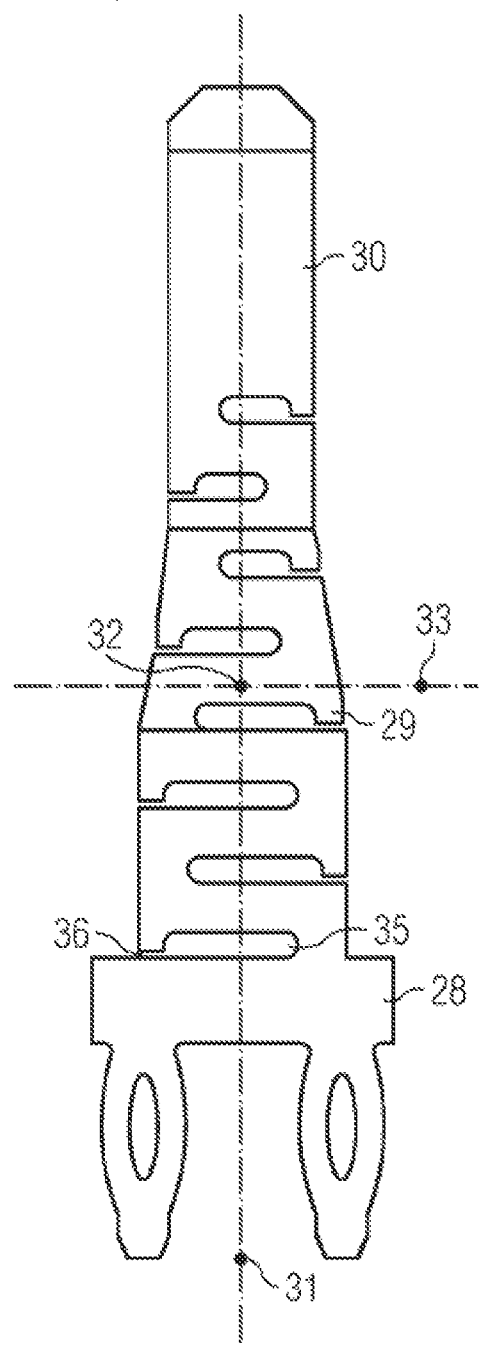
FIG. 3 shows a side elevation of a second exemplary embodiment of a contact pin in accordance with the invention.

The second contact pin 7 is connected to the support plate 3 via a first component longitudinal portion 28, shown in FIG. 2 and FIG. 3, and to the ring part 19 of the actuator 1, i.e., to a component, other than the support plate 3, of the electric machine, via a third component longitudinal portion 30, illustrated in FIG. 2 and FIG. 3, that directly adjoins a second component longitudinal portion, likewise visible in FIG. 2 and FIG. 3. The first component longitudinal portion 28 has a greater level of rigidity than the second component longitudinal portion 29. In accordance with the invention, it is also conceivable for the second component longitudinal portion 29 to be connected to the ring part 19.

FIG. 2 illustrates a first exemplary embodiment of a contact pin in accordance with the invention, which is also shown in FIG. 1 (as second contact pin 7). This contact pin has a first component longitudinal portion 28, a second component longitudinal portion 29 and a third component longitudinal portion 30, which are oriented in the direction of a longitudinal axis 31.

The first component longitudinal portion 28 has a greater level of rigidity than the second component longitudinal portion 29. This greater rigidity is flexural rigidity and at the same time torsional rigidity. The fact that the second component longitudinal portion 29 is formed in a manner narrowing in the direction of the longitudinal axis 31, or of its longitudinal axis 31, and is also formed in a manner so as to bend in multiple opposite directions, contributes to an advantageous elastic component behavior or rigidity behavior. A first bend 34 and further bends are provided, which are each configured in a manner curved through 90° or 180° with respect to a vertical axis 32, appearing in a projecting manner in FIG. 2, of the second component longitudinal portion 29.

Furthermore, in order to improve the elastic properties of the contact pin, a first recess 35 and further recesses, i.e., a plurality of recesses, are provided in the second component longitudinal portion 29 in the direction of the vertical axis 32 thereof.

Furthermore, the second component longitudinal axis 29 is formed in a manner so as to include a multiple of slots, i.e., a first slot 36 and further slots are provided in the direction of a transverse axis 33 of the second component longitudinal portion 29.

The first component longitudinal portion 28 directly adjoins the second component longitudinal portion 29 and is formed as a plug, which has been pressed into a support plate 3 shown in FIG. 1.

The third component longitudinal portion 30 directly adjoins the second component longitudinal portion 29, is partially formed as a cuboid and has partially beveled edges. Via the third component longitudinal portion 30, the contact pin is connected to a ring part 19, illustrated in FIG. 1, of an actuator 1.

FIG. 3 shows a second exemplary embodiment of a contact pin in accordance with the invention. This contact pin is formed in a similar manner to that of the first exemplary embodiment of the contact pin in accordance with the invention that is illustrated in FIG. 2. Therefore, largely identical reference signs to those in FIG. 2 are used in FIG. 3.

In contrast to FIG. 2, however, a second component longitudinal portion 29 of the contact pin does not have pronounced curves or bends on its outer sides. This brings about simpler manufacture.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A contact pin for an electric machine, comprising:
   at least one first component longitudinal portion; a second component longitudinal portion; and
   a third component longitudinal portion adjoining the second component longitudinal portion, the third component longitudinal portion including a multiple of slots; wherein the first component longitudinal portion has greater rigidity than the second component longitudinal portion; and
   wherein the second component longitudinal portion is formed in a manner continuously narrowing along a longitudinal axis of the contact pin.

2. The contact pin as claimed in claim 1, wherein the greater level of rigidity is a greater level of flexural rigidity.

3. The contact pin as claimed in claim 1, wherein the greater level of rigidity is a torsional rigidity.

4. The contact pin as claimed in claim 2, wherein the greater level of rigidity is a torsional rigidity.

5. The contact pin as claimed in claim 1, wherein the second component longitudinal portion includes a plurality of recesses.

6. The contact pin as claimed in claim 1, wherein the second component portion is formed in a manner so as to bend in a multiple of opposite directions.

7. The contact pin as claimed in claim 1, wherein the second component portion is formed in a manner so as to include a multiple of slots.

8. The contact pin as claimed in claim 1, wherein the first component longitudinal portion is connectable to a support plate of an electric machine.

9. The contact pin as claimed in claim 1, wherein one of (i) the second component longitudinal portion and (ii) the third component longitudinal portion adjoining the second component longitudinal portion is connectable to a component, other than a support plate, of the electric machine.

10. A support plate having the at least one contact pin as claimed in claim 1.

11. An electric machine having the at least one contact pin as claimed in claim 1.

* * * * *